United States Patent [19] [11] 4,388,455
Bales [45] Jun. 14, 1983

[54] PROCESS FOR PREPARING ESTER CARBONATE COPOLYMERS

[75] Inventor: Stephen E. Bales, Midland, Mich.

[73] Assignee: The Dow Chemical Company, Midland, Mich.

[21] Appl. No.: 378,693

[22] Filed: May 17, 1982

[51] Int. Cl.³ ............................................. C08G 63/64
[52] U.S. Cl. ...................................... 528/176; 528/26; 528/43; 528/125; 528/126; 528/128; 528/172; 528/173; 528/179; 528/182; 528/183; 528/185; 528/190; 528/191; 528/193; 528/194; 528/196; 528/198; 528/199; 528/201; 528/202; 528/203; 528/274; 528/298; 528/306; 528/307; 528/308
[58] Field of Search .............. 528/176, 193, 194, 183, 528/185, 125–128, 172–173, 179, 182, 185, 190, 191, 193, 194, 196, 198, 199, 201–203, 274, 298, 306–307, 308–309, 26, 43

[56] References Cited

U.S. PATENT DOCUMENTS

| | | | |
|---|---|---|---|
| 4,059,565 | 11/1977 | Yoshizaki et al. | 528/196 |
| 4,105,633 | 8/1978 | Swart et al. | 528/176 |
| 4,122,112 | 10/1978 | Koda et al. | 528/196 |
| 4,238,597 | 12/1980 | Markezich et al. | 528/179 |
| 4,260,731 | 4/1981 | Mori et al. | 528/173 |
| 4,278,787 | 7/1981 | Swart et al. | 528/191 |
| 4,310,652 | 1/1982 | DeBona et al. | 528/176 |
| 4,311,822 | 1/1982 | Dege et al. | 528/176 |
| 4,330,662 | 5/1982 | Bales | 528/176 |

Primary Examiner—Lester L. Lee

[57] ABSTRACT

Ordered ester/carbonate copolymers having improved properties at higher solids are provided by (1) contacting a dihydric organic compound such as bisphenol-A with a diacid halide such as terephthaloyl chloride and a carbonate precursor such as phosgene under conditions sufficient to form an ester/carbonate oligomer and (2) contacting the oligomer with additional carbonate precursor to produce the desired ordered ester/carbonate copolymer.

10 Claims, No Drawings

PROCESS FOR PREPARING ESTER CARBONATE COPOLYMERS

BACKGROUND OF THE INVENTION

This invention relates to linear ester carbonate copolymers that contain both carbonate groups and ester groups in the linear chain.

Polycarbonate resins are known to be tough and rigid and have moderately high softening temperatures. Of particular interest are the polycarbonates of bisphenol-A diols as described in U.S. Pat. No. 3,028,365. On the other hand, polyesters such as those described from terephthalic acid, isophthalic acid and/or 1,4-butane diol are well known as molding resins having high softening temperatures but poor impact resistance.

In the past, it has been a practice to make random linear copolymers containing ester and carbonate linkages in order to obtain polymers having heat distortion temperatures generally higher than those characteristic of polycarbonates. See, for example, U.S. Pat. Nos. 3,129,121; 3,549,570; 3,053,810; 3,030,331 and 3,220,976. Unfortunately, however, the desired increase in heat distortion in often not as high as needed for many applications. More particularly, any increase in heat distortion is achieved only by sacrificing almost all of the high impact resistance that is characteristic of polycarbonate resins.

Recently, it has been found that, by alternating or ordering the ester and carbonate linkages in the ester/carbonate copolymer molecule, improved thermal resistance is achieved without a corresponding sacrifice of physical strength. See, for example, U.S. Pat. Nos. 4,156,069; 4,105,633 and 4,278,787. Such copolymers are normally prepared in a two-step procedure wherein a dihydric phenol is reacted with a diacid chloride to form a hydroxy-terminated polyester oligomer, this oligomer is then reacted with phosgene to form the desired ordered ester/carbonate copolymer. In the preparation of such copolymer having a high ester to carbonate ratio, the polyester intermediate often precipitates from solution. When this precipitation occurs, it causes problems in polymer purification loss of mechanical and optical properties and an ester/-carbonate ratio different from that which is desired.

Therefore, it is highly desirable to provide an improved process for producing ordered ester carbonate copolymers wherein the copolymer is easily purified and exhibits the desired optical and mechanical properties at the desired ester to carbonate ratio.

SUMMARY OF THE INVENTION

This invention is such an improved process for making ordered ester/carbonate copolymers which process comprises the steps of (1) contacting in an organic liquid medium at dihydric organic compound with a carbonate precursor and a diacid halide under conditions such that the carbonate moieties are formed in the resultant intermediate product (oligomer) as soon as or before the ester moieties and (2) contacting this oligomer with additional carbonate precursor under conditions sufficient to form the desired ordered ester/carbonate copolymer.

In one embodiment, this invention is a prephosgenation process for making an ester/carbonate copolymer comprising the steps of (1) contacting in an organic liquid medium a dihydric organic compound with a carbonate precursor under conditions sufficient to form a dihydric carbonate, (2) contacting the dihydric carbonate with a diacid halide under conditions sufficient to form an ester/carbonate oligomer and (3) contacting the oligomer with a carbonate precursor under conditions sufficient to form the desired ester/carbonate copolymer.

In another embodiment, this invention is a con-add process for making an ester/carbonate copolymer which process comprises the steps of (1) concurrently contacting in an organic liquid medium a dihydric organic compound with a carbonate precursor and a diacid halide under conditions sufficient to form an ester/carbonate oligomer and (2) contacting the oligomer with additional carbonate precursor under conditions sufficient to form an ordered ester/carbonate copolymer.

Practice of this invention reduces the rate of precipitation from solution of the intermediate oligomers which are characteristically produced in conventional post-phosgenation procedures. Thus, the reaction mixture can contain higher concentrations of reactants and the intermediate oligomers, thereby reducing the amount of solvent which must be recycled for a given amount of copolymer. Surprisingly, the resulting ester/-carbonate copolymers have physical properties equivalent to or better than those of the ester/carbonate copolymers prepared by the post-phosgenation process.

The copolymers prepared in the practice of this invention are useful in most applications in which polycarbonates, polyester and copolymers thereof are conventionally employed. In particular, such copolymers are useful for making transparent, tough films and molded articles having high heat resistance. In addition, these copolymers may be blended with other polymers such as ABS resins, styrene/acrylonitrile copolymers and impact polystyrenes to provide moldable blends and/or they may be combined with reinforcing fibers, such as glass fibers in the production of various molded articles.

DETAILED DESCRIPTION OF ILLUSTRATIVE EMBODIMENTS

The dihydric organic compound employed in the practice of this invention is suitably any predominantly hydrocarbon compound containing at least two alcoholic hydroxyl groups wherein alcoholic hydroxyl includes phenolic hydroxyl. Included within the dihydric hydrocarbylenes are aliphatic diols including glycols and cycloaliphatic diols, aromatic diols, including alkaryl diols, dihydric phenols and aromatic diols having heterocyclic groups such as phenolphthalein. Of the dihydric hydrocarbylenes, the dihydric phenols are preferred.

The dihydric phenols preferably used in preparing the copolymers of the present invention are suitably any aromatic compound having an aromatic hydrocarbylene group to which is aromatically bonded two hydroxyl groups. Most advantageously, the dihydric phenols are those aromatic diols represented by the formula:

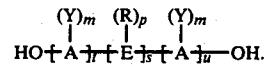

In the formula, A is an aromatic group such as phenylene, biphenylene, naphthenylene, anthracenylene and the like. E is alkylene or alkylidene such as methylene, ethylene, ethylidene, propylene, propylidene, isopropylidene, butylene, butylidene, isobutylidene, amylene, isoamylene, amylidene, and isoamylidene or E may be cycloalkylene such as cyclopentylene, cyclohexylene; a sulfur-containing linkage such as sulfide, sulfoxide or sulfone, an ether linkage; a carbonyl group; a tertiary nitrogen group of a silicone-containing linkage such as silane or siloxy. R is hydrogen or a monovalent hydrocarbon group such as alkyl, aryl, arylalkyl or cycloaliphatic; Y is chlorine, bromine, fluorine or R wherein R is defined above. The letter m is any whole number from and including zero through the number of positions on A available for substitution; p is any whole number from and including zero through the number of available positions on E; t is a whole number equal to at least one; s is either zero or one and u is any whole number including zero. Examples of such dihydric phenols include 2,2,-bis-(4-hydroxyphenyl)propane [bisphenol-A]; bis-(4-hydroxyphenyl)methane; 1,1-bis-(4-hydroxyphenyl)-ethane and others including dihydroxy aromatic ethers listed in U.S. Pat. No. 3,169,121 at Col. 2, line 60 through Col. 3, line 55.

Also included among the suitable dihydric phenols are those having an ar,ar'-dihydroxytrityl nucleus represented by the formula:

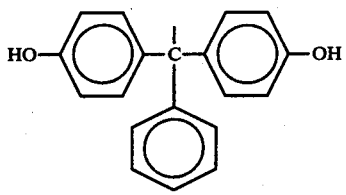

wherein the aromatic rings bear, in addition to the hydroxy substituents, such substituents as H, F, Cl, Br, I, —NO₂, —O—, alkyl, acyl, carboxylate ester, sulfonate ester and the like. Representative diols containing the ar,ar'-dihydroxytrityl nucleus include phenolphthalein nucleus compounds as described in U.S. Pat. No. 3,036,036; phenolsulfonephthalein nucleus compounds described in U.S. Pat. No. 3,036,037; phthalidene nucleus compounds as described in U.S. Pat. No. 3,036,038; fluorescein nucleus compounds as described in U.S. Pat. No. 3,036,039 and phenol-phthalimidene nucleus compounds corresponding to the phenolphthalein nucleus compounds described in U.S. Pat. No. 3,036,036; all of which patents are hereby incorporated by reference. Of the aforementioned dihydric phenols, the bis(ar-hydroxyphenyl)alkylidenes, particularly bisphenol-A, are most preferred.

The diacid halides that are suitably employed include both the acid halides of the aromatic and the saturated aliphatic dibacic acids. The saturated aliphatic dibasic acids which can be employed are derived from straight chain paraffin hydrocarbons such as oxalic, malonic, dimethyl malonic, succinic, glutaric, adipic, pimelic, suberic, azelaic and sebacic acid as well as the halogen substituted aliphatic dibasic acids. The aliphatic carboxylic acids containing heteroatoms in their aliphatic chain, such as thiodiglycollic or diglycollic acid can also be used as well as unsaturated diacids such as maleic or fumaric. Examples of aromatic and aliphatic aromatic dicarboxylic acids which can be employed in their acid chloride form are phthalic, isophthalic, terephthalic, homophthalic, ortho-, meta- and para-phenylenediacetic acid; the polynuclear aromatic acids such as diphenic acid, 1,4-naphthalic acid and 2,6-naphthalic acid. Of the foregoing diacid halides, preferred are isophthaloyl chloride, terephthaloyl chloride, as well as mixtures thereof, with the mixtures being most preferred.

The carbonate precursor employed is suitably a carbonyl dihalide, a carbonate ester, a haloformate or other compound which will suitably react with terminal hydroxyl groups to form carbonate linkages. The carbonyl halides which may be employed are carbonyl bromide, carbonyl chloride (phosgene) and mixtures thereof. Suitable carbonate esters are diphenyl carbonate, di(-halophenyl)carbonates such as di(chlorophenyl)carbonate, di-(bromophenyl)carbonate, di-(tri-chlorophenyl)-carbonate, di-(tri-bromophenyl)carbonate and the like; di-(alkylphenyl)carbonate such as di-(tolyl)carbonate; di-(naphthyl)carbonate, di-(chloronaphthyl)carbonate, phenyltolyl carbonate, chlorophenyl chloronaphthyl carbonate and mixtures thereof. Suitable haloformates include bishaloformates of dihydric phenols such as bischloroformates of hydroquinone or glycols such as bishaloformates of ethylene glycol, neopentyl glycol, polyethylene glycol and the like. Of the foregoing carbonate precursors, phosgene is preferred.

The process of this invention is practiced in a manner such that a portion of the carbonate moieties are formed simultaneously with or before the formation of ester moieties in the intermediate oligomer. By achieving this early carbonation in the intermediate oligomer, undesirable precipitation of the oligomer from the liquid reaction mixture is minimized.

The process of this invention is normally carried out under an inert atmosphere such as nitrogen with the reactants dissolved in one or more solvents such that the reactants are totally miscible. While the concentration of the reactants in the solvents is not particularly critical, the concentration of the dihydric organic compound is preferably from about 2 to about 10 weight percent, and the concentration of the diacid chloride is preferably from about 1 to about 5 weight percent based on the total weight of the reaction mixture. As a result of practicing the present invention, the concentration of the ester/carbonate intermediate oligomer can be greater than the concentrations of the ester intermediate oligomer which are normally employed in conventional procedures. Accordingly, such concentration of the ester/carbonate intermediate oligomer is in the range from about 3 to about 15, most preferably from about 5 to about 12, weight percent based on the total weight of the reaction mixture. It is preferred that the solutions of the various reactants be totally miscible in each other. However, it is sufficient if such solutions are partially miscible, i.e., at least 10 weight percent.

Examples of suitable solvents for the reaction mixture include chlorinated aliphatic hydrocarbons such as methylene chloride, chloroform, sym-tetrachloroethane, 1,1,2-trichloroethane and cis-1,2-dichloroethylene. Other solvents normally employed in the preparation of ester/carbonate copolymers may also be suitably employed.

The molar ratio of dihydric organic compound to diacid chloride varies proportionately with the ester:-carbonate ratio desired in the ester/carbonate copolymer. Generally, the molar ratio of dihydric compound to diacid chloride is advantageously from about 21:1 to about 1.1:1, preferably from about 21:1 to about 1.3:1.

The molar ratio of carbonate precursor to total moles of dihydric compound and diacid halide is advantageously from about 0.05:1 to about 0.91:1, preferably from about 0.13:1 to about 0.91:1.

In addition to the foregoing components, the process of the present invention is also carried out in the presence of a hydrogen chloride acceptor. Examples of such acceptors include pyridine, triethyl amine, N,N-trimethyl aniline and N,N-trimethylcyclohexyl amine, with pyridine being preferred. Such acceptors are advantageously employed in amounts sufficient to complex the hydrogen chloride liberated in the reaction and to catalyze both the formation of ester linkages and carbonate linkages. Since higher concentrations of acceptor produce higher molecular weight copolymers, the concentration of acceptor employed will vary depending on the molecular weight desired. Preferably, in order to prepare copolymers having weight average molecular weights ($M_w$) from about 25,000 to about 60,000, the acceptor is employed in amounts from about 100 to about 160 mole percent based on moles of hydroxyl moiety in the monomers, most preferably from about 120 to about 140 mole percent.

PRE-PHOSGENATION EMBODIMENT

In one embodiment of this invention (the pre-phosgenation process), the dihydric organic compound and the carbonate precursor are combined in the first stage in any manner, preferably by bubbling phosgene or another suitable carbonate precursor with stirring into a solution of the dihydric organic compound and hydrogen chloride acceptor. The molecular weight of the resultant carbonate intermediate oligomer is controlled by maintaining the mole ratio of the carbonate precursor to dihydric organic compound at less than 1:1 in the first stage. Preferably, the ratio of the carbonate precursor to dihydric organic compound in the first stage is from about 0.09:1 to about 0.95:1, most preferably from about 0.09:1 to about 0.5:1. Although not critical, the reaction temperature of this stage is preferably maintained in the range from about 10° to about 35° C., most preferably from about 15° to about 30° C., and the reaction pressure is normally maintained at atmospheric to superatmospheric as a matter of convenience. The hydrogen chloride acceptor is generally employed in an amount sufficient to take up whatever hydrogen chloride is generated in this stage, preferably from about 1.0 to about 1.6, most preferably from about 1.2 to about 1.4, moles of acceptor per mole of carbonate precursor. While the carbonate intermediate oligomer may be recovered and purified before continuing the pre-phosgenation process, it is generally not desirable to do so.

In the second stage of the pre-phosgenation process, the aforementioned reaction mixture containing a carbonate intermediate oligomer is converted to an ester/-carbonate intermediate oligomer having terminal hydroxy groups by combining a diacid halide with the reaction mixture in any manner, preferably by adding the diacid chloride either neat or dissolved in a suitable solvent with stirring to the reaction mixture which contains sufficient hydrogen chloride acceptor to absorb hydrogen chloride of reaction. Similar to the first stage, the reaction temperature and pressure are not critical. Preferably, however, the reaction temperature is maintained in the range from about 10° to about 35° C., most preferably from about 15° to about 25° C. and the reaction pressure is atmospheric to superatmospheric. In general, the amount of diacid chloride added to the reaction mixture is one which is sufficient to provide a molar ratio of ester moiety to carbonate moiety in the intermediate oligomer in the range from about 0.1:1 to about 20:1, most preferably from about 4:1 to about 20:1.

Finally, the ester/carbonate copolymer intermediate oligomer from the foregoing second stage is converted in the third stage of the pre-phosgenation process to the desired ordered ester/carbonate copolymer by bubbling phosgene or similar carbonate precursor into the reaction mixture. Advantageously, the reaction mixture contains an amount of monohydric phenol or other suitable chain terminator to effect the desired control of molecular weight of the ordered ester/-carbonate copolymer. While the amount of the chain terminator employed varies with the efficacy of the terminator, the molecular weight desired and the final ester/carbonate ratio, beneficial amounts of chain terminator are normally in the range from about 1 to about 15 mole percent based on the moles of dihydric organic compound less moles of the diacid halide, preferably from about 2 to about 12 mole percent. As in the previous two stages, reaction temperature and pressure are not critical. However, the reaction temperature is preferably in the range from about 10° to about 35° C., most preferably from about 15° to about 25° C. and the reaction pressure is preferably in the range from atmospheric to superatmospheric. In all three stages of the foregoing embodiment, the reaction mixtures are agitated sufficiently to effect intimate contact of the reactants and desirable heat transfer throughout the reaction medium. Following completion of the third stage of the embodiment, the desired ordered ester/carbonate copolymer is readily recovered from the reaction medium by conventional techniques as exemplified in the examples set forth hereinafter.

Con-Add Embodiment

In the first stage of this embodiment, the diacid halide and phosgene or other carbonate precursor are combined with the dihydric organic compound by continuously adding the diacid halide and carbonate precursor either neat or dissolved in a suitable solvent to a solution of the dihydric organic compound and a hydrogen chloride acceptor. While reaction temperature and reaction pressure are not critical for this stage of the con-add embodiment, the reaction temperature is preferably maintained in the range from about 10° to about 35° C., most preferably from about 15° to about 25° C. and reaction pressure is maintained at atmospheric to superatmospheric pressure as a matter of convenience. The amount of diacid halide added to the reaction mixture is that which produces the desired ester content in the copolymer. Examples of such suitable amounts are described hereinbefore. The amount of carbonate precursor added in this stage is such that the mole ratio of carbonate precursor to dihydric organic compound is less than 1:1, preferably from about 0.09:1 to about 0.95:1. As stated before, the diacid chloride and the carbonate precursor are added continuously to the reaction mixture containing the dihydric organic compound. While the rates of addition of the components are not particularly critical, it is generally desirable to add enough carbonate precursor early in the reaction in order to minimize the undesired precipitation that can occur when the resulting ester/carbonate intermediate oligomer contains essentially all ester linkages and no carbonate linkages. Preferably, sufficient carbonate precursor is added to provide at least 50 mole percent of the theoretical carbonate moieties in the ester/carbonate copolymer intermediate, most preferably from about 75 to about 95 mole percent. Advantageously, the carbonate precursor and diacid halide are added continuously at rates sufficient to provide the desired copolymer and will vary with reactor size and cooling capacity and the like. While the ester/carbonate intermediate oligomer may be recovered and purified before proceeding to the second stage of this con-add process, it is generally not desirable to do so.

In the second stage of the con-add process, the aforementioned reaction mixture containing the ester/carbonate oligomer is converted to the desired mixed copolymer by bubbling phosgene or other suitable carbonate precursor into the reaction mixture. Advantageously, the reaction mixture contains an amount of monohydric phenol or other suitable chain terminator to effect the desired control of molecular weight as is employed in the pre-phosgenation process. Although not critical, the reaction temperature of this stage is preferably maintained in the range from about 10° to about 35° C., more preferably from about 15° to about 25° C., and the reaction pressure is advantageously from atmospheric to superatmospheric, with atmospheric being preferred. As in the pre-phosgenation process, the reaction mixture in the con-add process is agitated sufficiently to effect intimate contact of the reactants and to provide heat transfer throughout the reaction medium. The resulting ordered ester/carbonate copolymer is readily recovered by conventional techniques as shown in the following examples.

The ordered ester/carbonate copolymers produced in the preferred practices of this invention are advantageously represented by the formula:

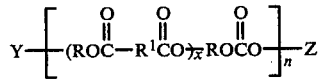

wherein Y and Z are independently terminating groups common to polyesters or polycarbonates; each R is independently a divalent organic moiety derived from the dihydric organic compound as defined hereinbefore, especially aromatic hydrocarbylene or inertly substituted aromatic hydrocarbylene; each $R^1$ is a divalent organic radical derived from a diacid halide as described hereinbefore, especially phenylene or other divalent aromatic moiety; x is a number from 0.05 to 10 and n is a whole number from about 5 to about 300. Using the aforementioned formula, the ester/carbonate mole ratio in the copolymer is defined by 2x/1. The process of this invention is particularly effective in the preparation of ester/carbonate copolymers having (1) relatively high ester/carbonate mole ratios, e.g., wherein x is from 1 to 10 in the foregoing structural formula, and (2) relatively high concentration of one ester, e.g., from about 70 to 100 percent of terephthalate or isophthalate based on total ester.

In the foregoing formula, $R^1$ is preferably para-phenylene, meta-phenylene or a combination of para-phenylene and meta-phenylene such that the molar ratio of para-phenylene to meta-phenylene is from about 0.95:0.05 to about 0.05:0.95, preferably from about 0.95:0.05 to about 0.2:0.8, most preferably from about 0.9:0.1 to about 0.5:0.5. Illustratively, Y is

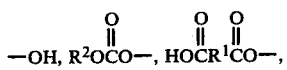

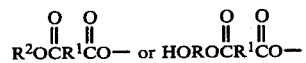

wherein $R^2$ is hydrocarbyl such as alkyl, aryl or aralkyl; and R and $R^1$ are as defined hereinbefore. Representative Z includes

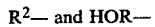

wherein $R^2$ and R are as defined hereinbefore.

More preferred are those copolymers represented by the formula:

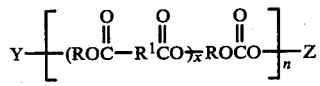

wherein Y is —OH or

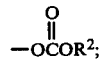

Z is $-R^2$ or —ROH; x is 0.05 to 10, preferably 0.05 to 3; and R, $R^1$, $R^2$ and n are as defined hereinbefore. Most preferred copolymers are those represented by the foregoing formula wherein R is

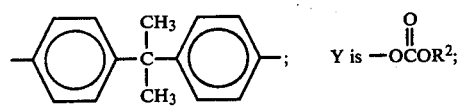

Z is $-R^2$; $R^2$ is hydrocarbyl, e.g., alkyl, aryl, alkaryl, cycloalkyl or aralkyl; x is 1 to 3; and n is a whole number from about 5 to about 300, preferably from about 10 to about 200 and most preferably from about 30 to about 100. For purposes of this invention, hydrocarbyl is a monovalent hydrocarbon radical.

While the molecular weight of the copolymers is not particularly critical, those having weight average molecular weight ($M_w$, determined by gel permeation chromatography using a bisphenol-A polycarbonate calibration curve) greater than 20,000 are of more significance. The copolymers of relatively high molecular weight, e.g., those having an $M_w$ of at least about 25,000 up to and including those having an $M_w$ of about 60,000, are found to exhibit the properties and physical characteristics most desirable of molding resins. Most preferred for this purpose are those copolymers having an $M_w$ in the range from about 25,000 to about 40,000 and $M_w/M_n$ (wherein $M_n$ is number average molecular weight) from about 1.5 to about 5. Preferred copolymers have inherent viscosities (measured in methylene chloride at 0.5 grams/deciliter aand 25° C.) in the range from about 0.35 to about 1 deciliter/gram (dl/g), most preferably from 0.45 to 0.70 dl/g.

The following examples are given to illustrate the invention and should not be construed as limiting its scope. Unless otherwise indicated, all parts and percentages are by weight.

EXAMPLE 1

Pre-phosgenation Process

In step 1 of a three-step process, a 5-liter flask is charged with 268.73 grams (1.177 moles) of bisphenol-A, 3.00 liters of methylene chloride and 242.1 grams (3.061 moles) of pyridine. Stirring is begun and when a clear solution of bisphenol-A is obtained, 38.8 grams (0.392 mole) of phosgene is added over a period of 20 minutes by bubbling the phosgene into the bisphenol-A solution at 23° to 25° C. while continuously stirring the contents of the flask at 200 rpm.

In step 2, the aforementioned reaction mixture containing the dihydric carbonate intermediate oligomer is combined with 159.32 grams (0.785 mole) of terephthaloyl chloride while the reaction mixture is being maintained at a temperature of 24° C. and being continuously stirred at 200 rpm. This addition of diacid chloride occurs by a continuous addition over a period of 3 minutes after which time, the temperature of the reaction mixture rises to 33° C. The reaction mixture is then stirred for an additional 5 minutes and 4.71 grams (0.031 mole) of t-butyl phenol (TBP) is added to the reaction mixture.

In step 3, the aforementioned reaction mixture containing a dihydric ester/carbonate intermediate oligomer is combined with 6.0 grams (0.061 mole) of phosgene by bubbling the phosgene into the reaction mixture at a rate of 1 gram per minute over a period of 6 minutes while maintaining the reaction mixture at 22° to 24° C. and stirring the mixture at 200 rpm.

The resulting ordered ester/carbonate copolymer is recovered from the reaction mixture by the following procedure:

0.5 liter of 3 N HCl is added to neutralize excess pyridine. Following phase separation, the methylene chloride solution of copolymer is washed consecutively with 0.5 liter of 0.5 N HCl and 0.5 liter of water, with phase separation after each washing. Following the final washing, the methylene chloride solution of copolymer is passed through a column packed with a cation exchange resin (sulfonic acid type, dead volume of 500 to 600 milliliters), giving a clear, almost water-white solution. The polymeric product is isolated by the slow addition of 1 volume of methylene chloride solution to 4 volumes of hexane with rapid stirring. The resulting white fibers are isolated by filtration, dried in air for 24 hours and then dried in vacuo for 48 hours at 120° C. to yield 354.1 grams (92.9 percent of theory) of copolymer having an inherent viscosity of 0.551 deciliter pergram (measured in methylene chloride at 25° C., 0.5 gram per deciliter). Analysis of the copolymer by IR and NMR analysis indicates that it is an ordered ester/carbonate copolymer represented by the structural formula:

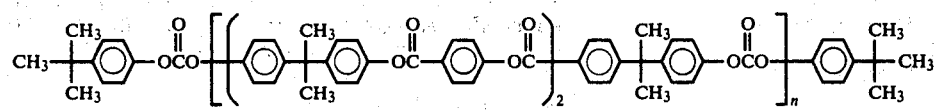

The copolymer repeating unit has an ester/carbonate molar ratio of 4:1.

This copolymer (Sample No. 1) is compression molded at 300° C. using a compression molding press sold by Pasadena Hydraulics Inc. The physical properties for the compression molded specimens (0.32 cm thickness) are shown in Table I. For the purposes of comparison, several additional runs are carried out in accordance with the foregoing procedure of this example except that different amounts of phosgene are added in the first stage of the process as is indicated in Table I. The resulting copolymers are similarly compression molded and tested and the results are recorded in Table I (Sample Nos. 2-3).

Also for comparison, several copolymers are prepared using a conventional procedure similar to the foregoing procedure except that it is a 2-stage process wherein phosgene is added only in the second stage (so-called post-phosgenation process). The resulting copolymers are similarly compression molded and tested for physical properties and the results are shown in Table I (Sample Nos. $C_1$-$C_4$).

EXAMPLE 2

Con-Add Process

In step 1 of a 2-step process, a 5-liter flask is charged with 268.73 grams (1.177 moles) of bisphenol-A, 2.70 liters of methylene chloride and 242.1 grams (3.061 moles) of pyridine. Stirring is begun and when a clear solution of bisphenol-A is obtained, 38.8 grams (0.392 mole) of phosgene and a solution of 159.32 grams (0.785 mole) of terephthaloyl chloride dissolved in 0.30 liter of methylene chloride are added continuously to the reaction vessel over a period of 20 minutes while continuously stirring the contents of the flask at 21° to 25° C. and 200 rpm. The terephthaloyl chloride is added to the reaction mixture via a liquid addition funnel and the phosgene is added by bubbling it into the liquid reaction mixture.

In step 2, the aforementioned reaction mixture containing the ester/carbonate intermediate oligomer is combined with 4.71 grams (0.031 mole) of t-butyl phenol. The resulting solution is stirred at 100 rpm and 8 grams (0.081 mole) of phosgene are added over a period of 6 minutes.

The resulting ordered ester/carbonate copolymer is recovered from the reaction mixture by the procedure of Example 1, analyzed and determined to have a structure similar to that of the ester-carbonate copolymer of Sample No. 1 in Example 1. This copolymer (Sample No. 4) is compression molded and tested as in Example 1 and the results are recorded in Table I.

For the purposes of comparison, several additional copolymers (Sample Nos. 5-8) are similarly prepared by the con-add process of this example except that the amount of phosgene added in the first stage of the process is varied as indicated in Table I. The resulting copolymers are similarly compression molded and tested for physical properties and the results of these tests are reported in Table I.

TABLE I

| Sample No. | 1 | 2 | 3 | 4 | 5 | 6 | 7 | 8 |
|---|---|---|---|---|---|---|---|---|
| Process Type (1) | PP | PP | PP | CA | CA | CA | CA | CA |
| COCl$_2$ in First Stage (2), mole % | 100 | 75 | 50 | 100 | 100 | 90 | 75 | 50 |
| DPC (3), g/l CH$_2$Cl$_2$ | 127 | 127 | 127 | 127 | 127 | 127 | 127 | 127 |
| TBP (4) mole % | 8 | 8 | 8 | 8 | 8 (11) | 8 | 8 | 8 |
| $\eta_{inh}$ (5), dl/g | 0.551 | 0.553 | 0.623 (10) | 0.589 | 0.540 | 0.537 | 0.620 | 0.581 (10) |
| Vicat (6), °C | 198 | 207 | 215 | 201 | 195 | 207 | 205 | 210 |
| Izod Impact (7), ft-lb/in, notched | 3.17 | 3.95 | 4.27 | 4.32 | 5.06 | 3.25 | 4.20 | 2.17 |
| Tensile (8), psi at Yield | 8958 | 8931 | 9046 | 8994 | 9158 | 9139 | 9365 | 9017 |
| Elongation (8), % at Yield | 9.35 | 9.20 | 9.46 | 8.61 | 9.12 | 9.49 | 9.21 | 9.56 |
| at Break | 15.6 | 16.7 | 19.8 | 16.1 | 21.7 | 14.9 | 21.5 | 21.3 |
| Tensile Modulus (8), psi × 10$^{-5}$ | 2.92 | 2.75 | 2.87 | 2.86 | 2.76 | 2.90 | 2.69 | 2.84 |
| Mole % ester (9) | 80.4 | 78.9 | 78.9 | 78.9 | 79.3 | 79.3 | 78.9 | 80.0 |

| Sample No. | C$_1$* | C$_2$* | C$_3$ | C$_4$ |
|---|---|---|---|---|
| Process Type (1) | S2S | S2S | S2S | S2S |
| COCl$_2$ in First Stage (2), mole % | 0 | 0 | 0 | 0 |
| DPC (3), g/l CH$_2$Cl$_2$ | 127 | 80 | 80 | 80 |
| TBP (4) mole % | 8 | 8 | 7 | 6 |
| $\eta_{inh}$ (5), dl/g | — (12) | 0.503 | 0.540 | 0.592 |
| Vicat (6), °C | 203 | 199 | 209 | 210 |
| Izod Impact (7), ft-lb/in, notched | 0.67 | 3.50 | 3.98 | 4.05 |
| Tensile (8), psi at Yield | — (13) | 8969 | 9118 | 8834 |
| Elongation (8), % at Yield | — (13) | 9.05 | 9.57 | 9.47 |
| at Break | 4.2 | 12.5 | 14.1 | 17.6 |
| Tensile Modulus (8), psi × 10$^{-5}$ | 2.70 | 2.75 | 2.67 | 2.80 |
| Mole % ester (9) | 75.6 | 79.3 | 79.5 | 80.0 |

*Not an example of the invention.
(1) PP = pre-phosgenation, CA = con-add, S2S = standard 2-stage (post-phosgenation).
(2) Percent of theoretical phosgene pre-added or con-added. Theoretical moles phosgene = mole bisphenol-A less moles terephthaloyl chloride.
(3) DPC = designed polymer concentration, defined as grams of polymer (theoretical, excluding terminator) per liter of CH$_2$Cl$_2$.
(4) Molar percent based on moles bisphenol-A less moles terephthaloyl chloride.
(5) Measured in CH$_2$Cl$_2$ at 0.5 gram per deciliter at 25° C.
(6) ASTM D-1525.
(7) ASTM D-256.
(8) ASTM D-638.
(9) Defined as $\frac{\text{moles ester}}{\text{moles ester + moles carbonate}}$ (100), determined by nuclear magnetic resonance spectroscopy.
Theoretical mole percent ester for all samples in 80.0.
(10) Slight haze (insoluble fraction) percent.
(11) T—butyl phenol added prior to phosgene and terephthaloyl chloride addition.
(12) Insoluble in CH$_2$Cl$_2$, not measured.
(13) Sample did not yield. Tensile at break = 6877 psi.

Copolymers from Sample Nos. 2, 5, C$_1$ and C$_2$ of Table I are tested for optical properties and the results are recorded in Table A.

TABLE A

| Sample No. | 2 | 5 | C$_1$* | C$_2$* |
|---|---|---|---|---|
| Yellowness Index (a) | 1.6 | 2.3 | 5.8 | 1.7 |
| Transmission (b), % | 86.3 | 85.1 | 75.5 | 86.8 |
| Haze (b), % | 12.7 | 14.0 | 101.0 | 14.3 |

*Not an example of the invention.
(a) ASTM D-1925 using molded films (0.043 cm thickness).
(b) ASTM D-1003 using same molded film used in (a).

EXAMPLE 3

Con-Add Process

In step 1 of a 2-step process, a 12-liter flask is charged with 716.60 grams (3.139 moles) of bisphenol-A, 7.40 liters of methylene chloride and 645.6 grams (8.161 moles) of pyridine. Stirring is begun and when a clear solution of bisphenol-A is obtained, 77.6 grams (0.784 mole) of phosgene and a solution of 424.85 grams (2.093 moles) of terephthaloyl chloride dissolved in 0.60 liter of methylene chloride are added continuously to the reaction vessel over a period of 39 minutes while continuously stirring the contents of the flask at 22° to 26° C. and 200 rpm.

In step 2, the aforementioned reaction mixture is stirred for 10 minutes following phosgene and terephthaloyl chloride addition, then 15.71 grams (0.105 mole)

of t-butylphenol is added. The resulting solution is stirred at 200 rpm and 42.0 grams (0.425 mole) of phosgene are added over a period of 28 minutes while maintaining the reaction mixture at 24° to 25° C.

The resulting ordered ester/carbonate copolymer is recovered from the reaction mixture by the general procedure of Example 1, analyzed, and determined to have a structure similar to that of the copolymer of Sample No. 1 in Example 1. This copolymer (Sample No. 9) is injection molded using a Newbury H1 30RS machine and the following molding conditions: barrel zone—329° C., nozzle—338° C., mold halves—121° C., injection time—10 seconds, cycle time—40 seconds, feed setting—2.5, and single stage injection mode. The physical and optical properties for the injection molded specimens (0.32 cm thickness) are shown in Table II.

For the purpose of comparison, additional copolymers are prepared using a conventional procedure similar to the foregoing procedure except that it is a 2-stage process wherein phosgene is added only in the second step (post-phosgenation). The resulting copolymers are similarly injection molded and tested for physical and optical properties and the results are shown in Table II (Sample Nos. $C_5$–$C_6$).

TABLE II

| Sample No. | 9 | $C_5$* | $C_6$* |
|---|---|---|---|
| Process Type (1) | CA | S2S | S2S |
| $COCl_2$ in First Stage (2), mole % | 75 | 0 | 0 |
| DPC (3), g/l $CH_2Cl_2$ | 127 | 127 | 80 |
| TBP (4) mole % | 10 | 8 | 9 |
| $\eta_{inh}$ (5), dl/g | 0.565 | — (12) | 0.551 |
| Vicat (6), °C. | 215 | 196 | 214 |
| Izod Impact (7), ft-lb/in, notched | 5.20 | 0.67 | 5.05 |
| Tensile (8), psi at Yield | 8724 | 8864 | 8702 |
| Elongation (8), % at Yield | 9.46 | 8.75 | 9.55 |
| at Break | 30.9 | 13.0 | 21.2 |
| Tensile Modulus (8), psi × $10^{-5}$ | 2.79 | 2.92 | 2.74 |
| Yellowness Index (9) | 33.8 | 13.3 | 32.1 |
| Transmission (10) % | 84.0 | 78.6 | 83.4 |
| Haze (10), % | 2.6 | 18.2 | 2.2 |
| Mole % ester (11) | 80.0 | 77.0 | 79.3 |

*Not an example of the invention.
(1)–(8) Same as (1)–(8) in Table I.
(9) ASTM D-1925.
(10) ASTM D-1003.
(11) Defined as $\frac{\text{moles ester}}{\text{moles ester + moles carbonate}}$ (100), determined by nuclear magnetic resonance spectroscopy. Theoretical mole percent ester for all samples is 80.0.
(12) Insoluble in $CH_2Cl_2$, not measured.

As evidenced by the data in Tables I, A and II, copolymers prepared by the pre-phosgenation and con-add processes (Sample Nos. 1–9) have improved properties (including better solubility, higher notched Izod impact strength, tensile strength, percent transmission, elongation and ester/carbonate ratios closer to theoretical) compared to the same polymers prepared at equivalent designed polymer concentrations (DPC) using the conventional 2-stage (post-phosgenation) process (Sample Nos. $C_1$ and $C_5$). The data of Tables I, A and II also show that the copolymers prepared in the practice of this invention (Sample Nos. 1–9) have equivalent or better properties compared to the copolymers prepared by the post-phosgenation process using lower designed polymer concentrations (Sample Nos. $C_2$–$C_4$ and $C_6$).

What is claimed is:

1. A process for making ordered ester/carbonate copolymers which process comprises the steps of (1) contacting in an organic liquid medium a dihydric organic compound with a carbonate precursor and a diacid halide under conditions such that the carbonate moieties in the resultant intermediate oligomer are formed simultaneously with or before the formation of ester moieties and (2) contacting this oligomer with additional carbonate precursor under conditions sufficient to form the desired ordered ester/carbonate copolymer.

2. The process of claim 1 wherein the amount of carbonate formed in the oligomer is sufficient to essentially prevent precipitation of the oligomer from the organic medium.

3. The process of claim 2 wherein the amount of carbonate moiety formed in the oligomer is at least 50 mole percent of the total carbonate moiety of the ordered ester/carbonate copolymer.

4. The process of claim 2 wherein the amount of carbonate moiety formed in the oligomer is from about 75 to about 95 mole percent of the total carbonate moiety of the ordered ester/carbonate copolymer.

5. The process of claim 2, 3 or 4 comprising the steps of (1) contacting in an organic liquid medium a dihydric organic compound with a carbonate precursor under conditions sufficient to form a dihydric carbonate, (2) contacting the dihydric carbonate with a diacid halide under conditions sufficient to form an ester/carbonate oligomer and (3) contacting the oligomer with a carbonate precursor under conditions sufficient to form an ordered ester/carbonate copolymer.

6. The process of claim 5 wherein the dihydric organic compound is a dihydric phenol, the diacid halide is terephthaloyl halide, isophthaloyl halide or mixture thereof, and the carbonate precursor is phosgene.

7. The process of claim 2, 3 or 4 which comprises the steps of (1) concurrently contacting in an organic liquid medium a dihydric organic compound with a carbonate precursor and a diacid halide under conditions sufficient to form an ester/carbonate oligomer and (2) contacting the oligomer with additional carbonate precursor under conditions sufficient to form an ordered ester/carbonate copolymer.

8. The process of claim 7 wherein the dihydric organic compound is a dihydric phenol, the diacid halide is terephthaloyl halide, isophthaloyl halide or mixtures thereof, and the carbonate precursor is phosgene.

9. The process of claim 1, 2, 3 or 4 wherein the mole ratio of ester to carbonate in the resulting ordered ester/carbonate copolymer is from about 0.1:1 to about 20:1.

10. The process of claim 9 wherein said ester:carbonate ratio is from about 2:1 to about 20:1.

* * * * *